United States Patent [19]

Harrer et al.

[11] 4,247,816
[45] Jan. 27, 1981

[54] POTENTIOMETER WITH DIGITAL DISPLAY

[75] Inventors: Josef B. Harrer, Dietramszell; Anton Jägers; Roland Petsch, both of Munich; Ernst Pracher, Oberhaching, all of Fed. Rep. of Germany

[73] Assignee: Litton Systems, Inc., Mount Vernon, N.Y.

[21] Appl. No.: 948,730

[22] Filed: Oct. 5, 1978

[30] Foreign Application Priority Data

Oct. 6, 1977 [DE] Fed. Rep. of Germany ....... 2745055

[51] Int. Cl.³ .............................................. G01R 27/02
[52] U.S. Cl. ..................................... 324/62; 340/524; 340/870.38
[58] Field of Search ..................... 324/62, 63, 99 D; 340/524, 177 VC; 246/122 R, 122 A, 182 A

[56] References Cited

U.S. PATENT DOCUMENTS

| | | | |
|---|---|---|---|
| 3,382,433 | 5/1968 | Escue | 324/63 |
| 3,786,350 | 1/1974 | Munt | 324/99 D X |

Primary Examiner—Stanley T. Krawczewicz

Attorney, Agent, or Firm—Brian L. Ribando

[57] ABSTRACT

This invention relates to a potentiometer with a digital display indicating the position of the potentiometer slider. In a known potentiometer of this type, a mechanical multidigit counter is mounted outside the potentiometer housing on the shaft carrying the slider. However, since the counter is mounted on the potentiometer shaft proper, the potentiometer must be inconveniently mounted in an apparatus at a point at which the counter can be read. Another disadvantage of the known potentiometer results from the fact that restrictions exist for the scale of the counter. The present invention provides a potentiometer of the above-specified type which is of simple design and is more versatile than known potentiometers. The advantage of the potentiometer according to this invention is that the display means can be mounted at a point remote from the potentiometer. In a preferred embodiment of the invention, a voltage divider is inserted before the input of an analog-to-digital converter which drives a digital readout device. By appropriately dimensioning the voltage divider, a certain predetermined range of the counter can be obtained in a simple manner.

3 Claims, 1 Drawing Figure

POTENTIOMETER WITH DIGITAL DISPLAY

TECHNICAL FIELD

This invention relates to a potentiometer with a digital display indicating the position of the potentiometer slider.

BACKGROUND OF THE PRIOR ART

In a known potentiometer of this type, a mechanical multidigit counter is mounted outside the potentiometer housing on the shaft carrying the slider. The counter is coupled to the shaft of the potentiometer and provides a direct digital indication of the angular position of the shaft. Digital displays of this type are usually employed on multi-turn potentiometers in which the position of the slider is difficult to determine from the outside.

There are a number of disadvantages which are typical of potentiometers of this type. Since the counter is mounted on the potentiometer shaft proper, the potentiometer must be mounted in an apparatus at a point at which the counter can be read. This means that normally the potentiometer must be mounted on the front plate of the instrument. This is a considerable restriction in regard to the configuration of the circuit elements.

Another disadvantage of the known potentiometer results from the fact that restrictions exist for the scale of the counter. Unless a counter especially designed for a particular potentiometer is used, one must be satisfied with a total slider path length corresponding to a conter position of, say, 897 scale divisions. It is usually desirable to relate an even number such as 1000 to the total path length of the slider

BRIEF SUMMARY OF THE INVENTION

The goal of the present invention is to provide a potentiometer of the above specified type which is of simple design and is more versatile than known potentiometers.

The advantage of the potentiometer according to this invention is that the display means can be mounted at a point remote from the potentiometer. The potentiometer proper can be mounted at some advantageous position.

In a preferred embodiment of the invention, a voltage divider is inserted before the input of an analog-digital converter. By appropriately dimensioning the voltage divider, a certain predetermined range of the counter can be obtained in a simple manner.

Since in a preferred embodiment the voltage divider is provided with at least one adjustable resistor, arbitrary numerical values can be assigned to both the starting point and the end point of the slider path. For example, in the potentiometer according to the invention, it is possible to assign the numerical value "zero" to the initial position of the slider, and the numerical value "1000" to the end point position of the slider.

BRIEF DESCRIPTION OF THE DRAWING

The following description refers to an embodiment of the present invention which is explained with reference to the drawing comprising a single figure.

DETAILED DESCRIPTION OF THE INVENTION

Figure 1:
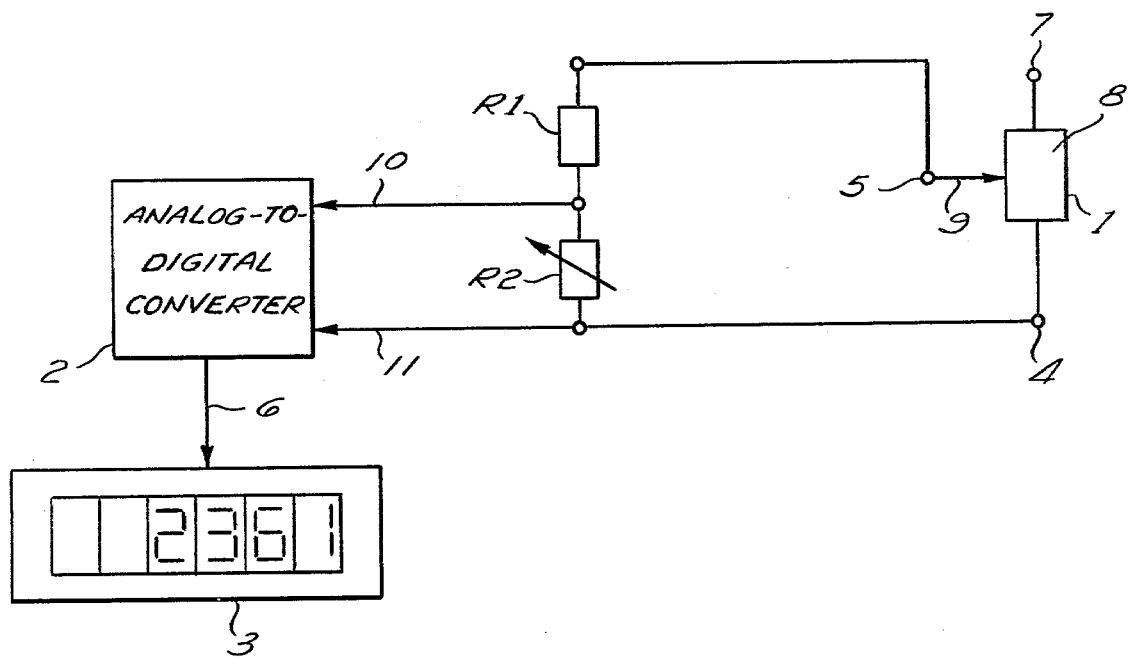
FIG. 1 shows a block diagram of the potentiometer according to the invention.

A voltage divider consisting of two resistors R1 and R2 is connected in parallel with one potentiometer terminal 4 and the slider terminal 5 of a potentiometer 1, the potentiometer 1, including a resistor element 8 and a slider 9 for making sliding contact with the resistor element 8.

Variable resistor R2, which is used as an adjusting resistor, is connected in parallel with the input 10, 11 of an analog-to-digital converter 2. The voltage divider R1, R2 is used to adapt the voltage derived from the potentiometer to the input voltage range of the analog-to-digital converter. The output 6 of the analog-to-digital converter 2 is used to drive a light-emitting diode (LED) display apparatus 3.

The voltage drop at the top of resistor R2 is applied to the analog-to-digital converter and is directly proportional to the resistance appearing between the slider terminal 5 and the terminal 4 corresponding to the end of the potentiometer path. In this manner, the position of the slider can be recognized by electronic means in the analog-to-digital counter 2 and displayed in the LED display apparatus 3. In most applications, and for purposes of maintaining linearity, it is important that the voltage between the terminals of the end points of the potentiometer path be undisturbed, to the extent possible, by the loading caused by the analog-to-digital converter 2. Thus, the resistor values R1 and R2, as well as the input impedance of the analog-to-digital converter 2 must be high.

Naturally, other electro-optical display means such as a liquid crystal display can be used in place of the LED display. Further, by appropriately dimensioning the voltage divider resistors R1 and R2, the number of digits of the display means can be used to the greatest possible advantage to obtain precise readings. By appropriately setting adjusting resistor R2, for example, it is possible to obtain an "even" value, such as 1000 or 10,000, on the display means when the slider has reached its terminal position adjacent terminal 7. This possibility of adjustment simplifies the use of the potentiometer. A conventional analog-to-digital converter can be employed, and one is commercially vailable under the designation ICL 7107 of the company INTERSIL.

We claim:

1. In a variable potentiometer device having an electronically driven digital output display, the combination comprising:
    a potentiometer resistor,
    means for applying a voltage to the potentiometer resistor,
    a slider for picking off a variable voltage from the potentiometer resistor as a function of the position of the slider on the potentiometer resistor,
    a voltage divider comprising a fixed resistance element and a variable resistance element,
    means for coupling said variable voltage to the voltage divider,
    a digital output display, and
    an analog-to-digital converter connected in parallel with the variable resistance element of the voltage divider and driving the digital output display, whereby the variable resistance element adjusts the input to the analog-to-digital converter to provide an electronically driven output of a selected value on the digital output display when the slider terminal is in a known position on the potentiometer resistor.

2. The device of claim 1 further comprising high resistance elements comprising the fixed resistance element and the variable resistance element and the analog-to-variable voltage on the potentiometer is unaffected by the loading caused by the analog-to-digital converter and voltage divider combination.

3. The device of claim 2 further comprising an LED display comprising the digital output display.

* * * * *